United States Patent [19]

Leveque

[11] Patent Number: 5,058,202
[45] Date of Patent: Oct. 15, 1991

[54] SYSTEM AND METHOD OF TRANSMITTING AND RECEIVING A LICOMPEX MODULATED SIGNAL OVER A COMMUNICATION CHANNEL UTILIZING FREQUENCY MODULATION TECHNIQUES

[75] Inventor: Howard Leveque, Columbia, Md.

[73] Assignee: AMAF Industries, Inc., Columbia, Md.

[21] Appl. No.: 398,707

[22] Filed: Aug. 25, 1989

[51] Int. Cl.[5] .......................... H04B 1/00; H04B 1/64
[52] U.S. Cl. ....................................... 455/43; 455/72; 333/16; 370/7
[58] Field of Search ........................ 455/42, 43, 68, 72, 455/214, 102; 333/14, 16; 381/106; 370/7

[56] References Cited

U.S. PATENT DOCUMENTS

| | | | |
|---|---|---|---|
| 2,820,138 | 1/1958 | Haard | 455/23 |
| 3,827,052 | 7/1974 | Tanaka | 455/72 |
| 3,908,168 | 9/1975 | McMahon | 455/20 |
| 4,021,737 | 5/1977 | Trask | 455/23 |
| 4,034,295 | 7/1977 | Kolezawa et al. | 455/72 |
| 4,123,711 | 10/1978 | Chow | 455/72 |
| 4,271,499 | 6/1981 | Leveque | 455/72 |
| 4,642,583 | 2/1987 | Fucito et al. | 455/72 |
| 4,839,906 | 6/1989 | Leveque et al. | 455/72 |
| 4,893,347 | 1/1990 | Eastmond et al. | 455/52 |

FOREIGN PATENT DOCUMENTS 55-34580 3/1980 Japan ................................ 455/43

OTHER PUBLICATIONS

Cannon, Recording or Broadcasting Utilizing Automatic Gain Control Compressor, IBM Technical Disclosure Bulletin, vol. 10, No. 12, May 1968.

Primary Examiner—Reinhard J. Eisenzopf
Assistant Examiner—Lisa Charouel

[57] ABSTRACT

A system for transmitting and receiving frequency modulated signals utilizes linked compressor/expander (Lincompex) techniques. The signal to be transmitted is first processed by a Lincompex modulator which infinitely compresses the signal and produces a control tone representative of this compression process. After being processed by the Lincompex modulator, the compressed signal is frequency modulated and transmitted. A receiver having a Lincompex demodulator is used to receive the modulated signal. The received signal is initially demodulated by a discriminator prior to being expanded by the Lincompex demodulator according to the received control tone.

22 Claims, 7 Drawing Sheets

LINCOMPEX MODULATOR

LINCOMPEX DEMODULATOR

PRE-EMPHASIS

DE-EMPHASIS

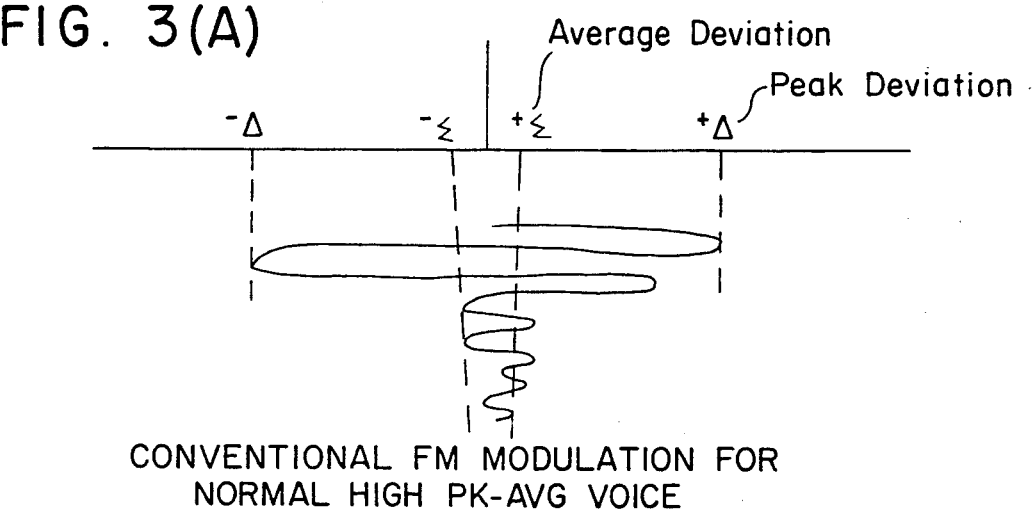
CONVENTIONAL FM MODULATION FOR
NORMAL HIGH PK-AVG VOICE
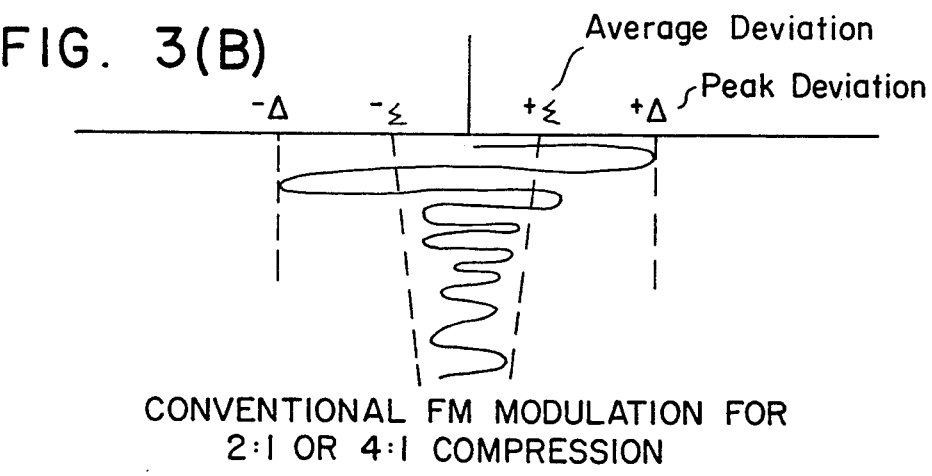
CONVENTIONAL FM MODULATION FOR
2:1 OR 4:1 COMPRESSION
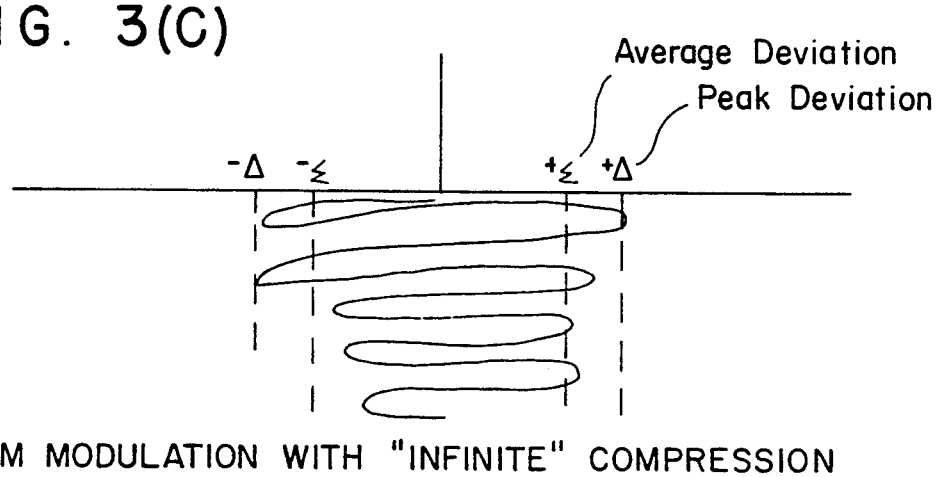
FM MODULATION WITH "INFINITE" COMPRESSION DISCRIMINATOR OUTPUT (MODULATION)
(CONVENTIONAL)
FIG. 4(B)
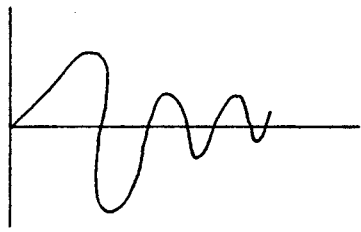
DISCRIMINATOR OUTPUT (MODULATION)
(2:1 OR 4:1 COMPRESSION)
DISCRIMINATOR OUTPUT (MODULATION)
("INFINITE" COMPRESSION)

SYSTEM AND METHOD OF TRANSMITTING AND RECEIVING A LICOMPEX MODULATED SIGNAL OVER A COMMUNICATION CHANNEL UTILIZING FREQUENCY MODULATION TECHNIQUES

FIELD OF THE PRESENT INVENTION

The present invention relates to telecommunication systems in general, and more particularly, to the transmission of Lincompex modulated signals produced by a linked compressor-expander circuit (Lincompex) using frequency modulation (FM).

BACKGROUND OF THE PRESENT INVENTION

Linked compressor and expander (Lincompex) systems are known in the telecommunications art. These systems have been implemented to enhance the quality of high frequency/single sideband voice links by 10 to 14 dBs. Analog voice transmission over HF and VHF/UHF links was often limited by the variability of the transmission medium, interference, and noise. The traditional way to overcome these various limitations was to increase the transmitter power. However, by increasing the transmitter power, the size, weight, power, and cost of the radio equipment also increased. On the other hand, by implementing Lincompex techniques into an HF/SSB System, the various past limitations have been overcome with a low cost lightweight radio system that offers channel quality improvement equivalent to an increase of 10 to 14 dB in apparent transmitter output power.

An example of such a Lincompex System is shown in FIGS. 1(A) and 1(B) of the present application. FIG. 1(A) shows the Lincompex modulator utilized in the transmitter of the high frequency/single sideband transmitter while FIG. 1(B) shows the digital Lincompex demodulator located in the receiver of the high frequency/single sideband receiver. These Lincompex circuits are representative of the Lincompex System taught in U.S. Pat. No. 4,271,499, entitled "Method and Apparatus for Digital Implementing a Linked Compressor-Expander Telecommunications System", to Leveque, the Inventor of the present application.

FIG. 1(A) of the present application illustrates a prior art Lincompex modulator similar to the modulator illustrated in the '499 Patent. In such a Lincompex modulator, the information to be transmitted is introduced as an input to the Lincompex modulator. The inputted information is passed through a filter 21 prior to being inputted into a compressor 23. The output of the compressor 23 is fed into a lowpass filter 25 to confine the frequency spectrum of the information below the 2900 Hz control tone. This lowpass filtered signal is then inputted into a summer 27.

The inputted signal is also received by an envelope estimate circuit 29 which outputs an amplitude signal representing the amplitude variance of a given syllable of a speech signal. The envelope estimate circuit 29 outputs this amplitude signal which is inputted to both the compressor 23 and a log circuit 31. The log circuit 31 outputs a logarithmic signal representing the logarithmic value of the amplitude signal to a FM modulator 33. The FM modulator 33 outputs a control tone to the summer 27 wherein the summer outputs a combined signal from the Lincompex modulator.

In operation, this Lincompex modulator utilizes lowpass filter 21 to confine the frequency spectrum of the information being inputted below the 2900 Hz control tone. The amplitude of the inputted signal is measured and used as a divisor for the signal waveform in the compressor 23 to form a syllabically constant waveform envelope. The logarithm of the envelope estimate modulates the frequency of a control tone with a deviation constant of 2 Hz/dB. This control tone is added to the compressed signal waveform and the sum is converted to an analog waveform for output to the transmitter.

FIG. 1(B) of the present application illustrates a prior art Lincompex demodulator similar to that illustrated in the '499 Patent. This Lincompex demodulator receives a input signal which is fed to a lowpass filter 41. The lowpass filter 41 outputs a filtered signal to a fading regulator 43. The fading regulator 43 further outputs a compensated signal to an expander 45. Moreover, this Lincompex demodulator also feeds the inputted signal into a bandpass filter 47 to recover the envelope signal. This bandpass filtered signal is further inputted into a frequency discriminator 49. The frequency discriminator 49 outputs a voltage signal to an exponential circuit 51. The exponential circuit 51 calculates an exponential value of the received voltage signal and inputs this exponential value into the expander 45.

In operation, this Lincompex demodulator receives a combined signal including a compressed signal and control tone from a radio frequency receiver which introduces the combined signal to the Lincompex demodulators input. The Lincompex demodulator, expands the compressed signal according to the extracted control tone information, and outputs an analog waveform. To achieve this result, the Lincompex demodulator isolates the compressed signal from the control tone by passing the inputted signal through a lowpass filter 41 to remove the control tone information from the combined signal. This compressed signal is further gain controlled by the fading regulator 43. The control tone is isolated from the remainder of the Lincompex demodulator input by the bandpass filter 47 and demodulated by the frequency discriminator 49 to extract its instantaneous frequency. This frequency level is transformed by an exponential circuit 51 to obtain the estimate of envelope magnitude. The compressed signal is then amplitude multiplied by the recovered envelope estimate in the expander 45 to amplitude expand the signal into the original waveform. While this processing is done in the '499 patent digitally, the digital representation of the originally encoded waveform provided at the input of the Lincompex modulator of FIG. 1(A) may be easily converted into an analog waveform for output at the same peak level as the originally encoded waveform.

By utilizing the Lincompex System, the HF link is improved as follows. First, at the transmitter where the power is limited to the available peak power, the Lincompex compressing of the peaks allows the RMS level to be increased by up to 6-9 dB. Secondly, the corresponding expansion at the demodulator has the effect of quieting noise during the periods of low speech energy and amplifying during the syllabic periods of speech. Since noise is much more noticeable during periods of speech silence, the net effect of the expansion is a perceived quality improvement of 3-6 dB.

On the other hand, it was thought that the transmission of Lincompex signals using frequency modulation would not realize any additional benefits since there is no correlation between an increase in apparent transmitter power in AM/SSB and an increase in the S/N ratio at the discriminator input in an FM system if both signals are produced by the same baseband processing techniques. In other words, the benefits received in the AM transmission would not necessarily be realized in a FM system. However, it would be be very beneficial to achieve results in a FM system similar to the results realized in the HF/SSB system because FM transmission is very desirable due to the reduction in size of the radiating elements, the use of FM transmission in multiplexing techniques, reduction of noise and interference, etc. To understand this expectation that a FM system would not benefit from Lincompex techniques, a prior art FM system will be discussed briefly.

A typical FM transmitter includes a signal input device, connected to a compressor which compresses the received input signal. The compressed signal is received by a pre-emphasis circuit which emphasizes the higher frequency components of the compressed signal by adding power to the higher frequencies which have a normally lower amplitude and thus being more susceptible to noise. This creates a greater signal to noise ratio in the higher frequencies.

An example of the operations of this pre-emphasis circuit can be seen in FIG. 2(A). In the prior art pre-emphasis circuits, as demonstrated in FIG. 2(A), the frequency components below 1 kHz are amplified at a constant level whereas the frequencies above 1 kHz are amplified to increasing degrees. The actual level of amplification for these higher frequency components is typically determined by a ratio 6 dB per octave.

After being emphasized by the pre-emphasis circuit, the emphasized compressed signal is inputted into a FM modulator. The FM modulator modulates the emphasized compressed signal with a carrier frequency to produce a frequency modulated signal. This frequency modulated signal is amplified by a radio frequency power amplifier prior to transmission over a transmission medium.

The actual characteristics of the transmitted frequency modulated signal is dependent upon the functions of the compressor. As shown in FIGS. 3(A) and 3(B), the compression ratio utilized by the compressor has a substantial effect upon the characteristics of the outputted frequency modulated signal. For example, FIG. 3(A) demonstrates the characteristics of a frequency modulated signal for a normal high peak-average voice signal with no compression. In this example, the peak deviations of the frequency modulated signal are substantially greater than the average deviation of the same signal. On the other hand, as demonstrated in FIG. 3(B), the use of a compressor can cause a frequency modulated signal to realize a greater average deviation. However, for typical compressors as demonstrated in FIG. 3(B), the average deviation is still substantially less than the peak deviation.

As is well known in the art, it is desired to have the highest possible compression ratio when utilizing frequency modulation transmission because the discriminator in the receiver outputs a voltage signal corresponding to the frequency swing of the received modulated signal, thereby the discriminator outputs a demodulated FM signal with a higher average voltage when a more compressed signal is received. This increase in the average voltage output of the discriminator is equivalent to achieving higher transmitter power in an AM signal.

As demonstrated in FIGS. 4(A) and 4(B), the discriminator output signal is increased as the compression ratio utilized in the transmitter is increased. Thus, for a given amount of noise, the signal to noise ratio will increase as the compression ratio increases. This is desired because the signal to noise ratio represents the quietness of the received signal, i.e., the higher signal to noise ratio the better the quality of the received signal and the better the quietness of the received signal.

However, while working with the Lincompex System in combination with a HF/SSB system, the Applicant discovered, contrary to expectations, that the Lincompex System can also be utilized in conjunction with a frequency modulation signal and exhibits an improvement ranging from 6 to 10 dB. When operating with the FM System, the Lincompex System allows the RMS frequency deviation to be increased without increasing the spectrum occupancy. This increases the signal component at the discriminator output. The expander follows the discriminator and quiets the noise so that both modulator and demodulator improvement factors are apparent in an FM Lincompex System. Thus, the FM Lincompex System realizes an apparent increase in the FM threshold, on a syllabic basis, as viewed by a weak signal approaching the threshold. Also, the use of the control tone concept of the Lincompex System eliminates the weak-signal "hiss" between syllabics.

OBJECT OF THE PRESENT INVENTION

Therefore, it is an object of the present invention to employ frequency modulation techniques to the transmission of Lincompex complex waveforms.

It is another object of the present invention to employ frequency modulation techniques in the transmission of Lincompex complex waveforms to allow the RMS frequency deviation to be increased without increasing the spectrum occupancy.

It is a further object of the present invention to utilize frequency modulation techniques in the transmission of Lincompex complex waveforms such that the actual Lincompex operation is transparent with respect to the frequency modulation operation.

It is a still further object of the present invention to utilize frequency modulation in the transmission of Lincompex complex waveforms without having an effect on channel bandwidth.

It is still a further object of the present invention to utilize frequency modulation techniques in the transmission of Lincompex complex waveforms to increase the signal to noise ratio at the input of the FM discriminator.

It is still a further object of the present invention to utilize frequency modulation in the transmission of Lincompex complex waveforms to increase the FM threshold.

It is still a further object of the present invention to utilize frequency modulation techniques in the transmission of Lincompex complex waveforms to eliminate the weak-signal "hiss" between syllables.

These and other objects of the present invention will become more readily apparent from a better understanding of the preferred embodiments described below with reference to the following drawing Figures.

SUMMARY OF THE PRESENT INVENTION

The above-mentioned objects of the present invention of utilizing frequency modulation techniques to transmit a Lincompex complex waveform are achieved by virtue of the concepts of the present invention, whereby a Lincompex complex waveform may be transmitted over a communication channel utilizing frequency modulation techniques. According to the teachings of the present invention, a signal to be frequency modulated before transmission is processed by a Lincompex modulator which compresses the input signal and produces a control tone representative of the compression or attenuation of the compressed signal. The present invention also teaches that after frequency demodulation, a received signal is expanded by a Lincompex demodulator in accordance with the received control tone.

According to the teachings of one embodiment of the present invention, voice or data (any frequency limited complex waveform) signal is initially compressed by a Lincompex modulator prior to the actual frequency modulation in the transmitter. During the compression process, a control tone is also produced representing the compression of the signal prior to frequency modulation.

According to the teachings of another embodiment of the present invention, the received compressed signal and control tone are demodulated by a Lincompex demodulator wherein the compressed signal is expanded by the Lincompex demodulator according to the received demodulated control tone.

BRIEF DESCRIPTION OF THE DRAWINGS

The present invention will become more fully understood from the detailed description given below and the accompanying drawings which are given by way of illustration only and are not intended to limit the present invention, and wherein:

FIGS. 3(A), 3(B), and 3(C) illustrate FM modulation for different levels of compression;

FIGS. 4(A), 4(B), and 4(C) illustrate modulation output from a discriminator of signals having different compression levels;

The above-mentioned drawings will be described in detail in the following detailed description.

DETAILED DESCRIPTIONS OF THE PRESENT INVENTION

The present invention will be described with reference to a general description of Lincompex techniques which may be implemented digitally or otherwise. However, the preferred embodiments contemplate the use of digital Lincompex techniques to practice the teachings of the present application. Accordingly, to the extent necessary, the Applicant hereby incorporates by reference the entirety of the disclosure of U.S. Pat. No. 4,271,499, entitled "Method and Apparatus for Digitally Implementing a Linked Compressor-Expander Telecommunication System", invented by the Inventor of the present application.

With respect to these concepts of frequency modulation transmission, the present invention proposes to utilize Lincompex techniques to increase the compression ratio of the transmitted signal while also reducing the noise perceived by the ear of the operator receiving the signal at a receiver. To realize these goals, the present invention contemplates the use of a Lincompex modulator in combination with a frequency modulator for transmitting frequency modulated signals as well as the use of frequency demodulator and a Lincompex demodulator for receiving the frequency modulated signals at a receiver. The preferred embodiments of the present invention which realize the above-noted goals and their operation will be described in detail below.

Figure 5A:
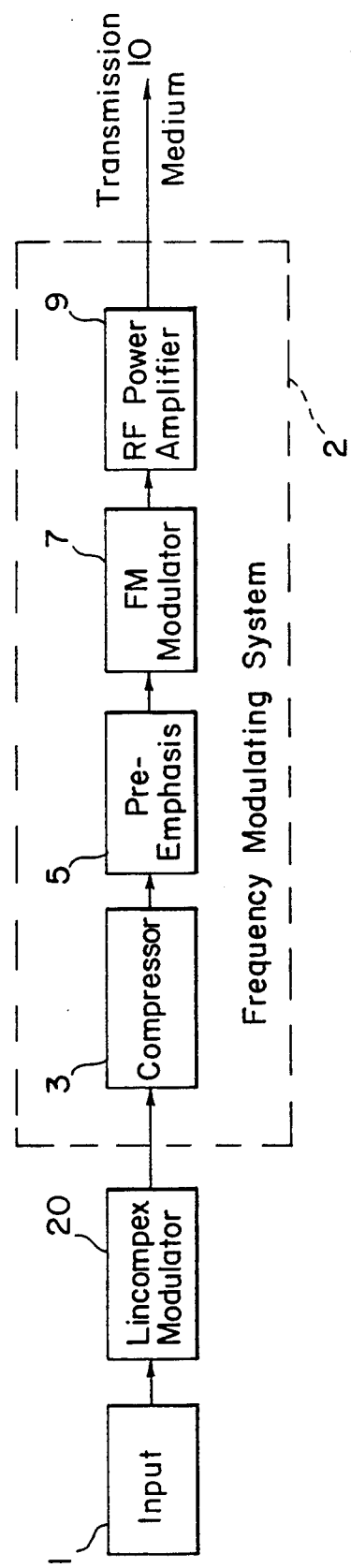
FIGS. 5(A) and 5(B) illustrate a FM Lincompex transmission system according to one preferred embodiment of the present invention.
Figure 5B:
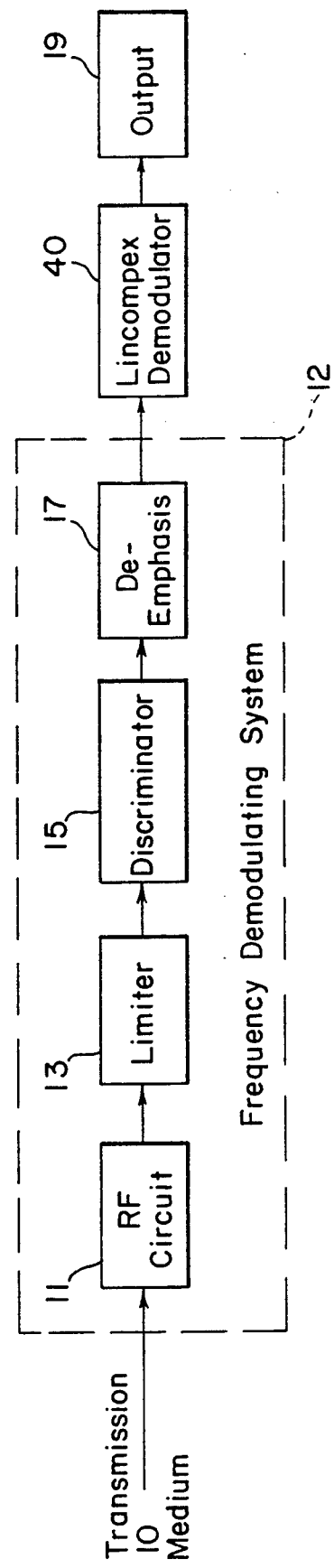

FIGS. 5(A) and 5(B) illustrate a frequency modulation transmitting and receiving system which utilizes Lincompex techniques according to one embodiment of the present invention.

In FIG. 5(A), a signal input device 1 (such as a microphone, etc.) inputs a signal representing the information to be transmitted. This input signal is provided to a Lincompex modulator 20. The Lincompex modulator 20 processes the input signal to produce a compressed signal and a control tone representing the amplitude variance of the input signal in the manner described generally in the Leveque '499 patent. The combined signal including the compressed signal and control tone is inputted into a compressor 3 which further compresses the combined signal. The compressor 3 outputs the further compressed signal into a pre-emphasis circuit 5 which emphasizes the higher frequency components of the further compressed signal and control tone. The compressor 3 and the pre-emphasis circuit 5 may also be placed before the Lincompex modulator 20. Furthermore, the compressor 3 and the pre-emphasis circuit 5 may be split up with the compressor 3 preceding the Lincompex modulator 20 and the pre-emphasis circuit 5 following the Lincompex modulator 20, or vice-versa. The pre-emphasized signal is outputted from the pre-emphasis circuit 5 and inputted into a FM modulator 7. The FM modulator 7 frequency modulates the pre-emphasized signal and outputs a frequency modulated complex waveform to the radio frequency power amplifier 9. The radio frequency power amplifier 9, after amplifying the frequency modulated complex waveform, transmits the frequency modulated complex waveform into the transmission medium 10. In this embodiment, the compressor 3, pre-emphasis circuit 5, FM modulator 7, and radio frequency power amplifier 9 constitute a standard frequency modulating system 2. Again, the compressor 3 and pre-emphasis circuit 5 may be arranged differently as discussed above.

FIG. 5(B) shows a receiver which receives the frequency modulated complex waveform that has been transmitted through the transmission medium 10. This frequency modulated complex waveform is received by a radio frequency circuit 11 which amplifies the received frequency modulated complex waveform to overcome the power loss during transmission. The radio frequency circuit 11 outputs the amplified received frequency modulated complex waveform into a limiter 13. The limiter 13 removes spurious amplitude variations from the frequency modulated complex waveform without destroying the modulation. The output from the limiter 13 is inputted into a frequency discriminator 15. The frequency discriminator 15 produces an output voltage linearly dependent upon the instantaneous frequency of the inputted signal. This output voltage from the frequency discriminator 15 is then inputted into a de-emphasis circuit 17 where the higher frequency components of the output signal from the discriminator 15 are de-emphasized to remove the emphasis originally applied by the pre-emphasis circuit 5 of the transmitter. This de-emphasized signal is inputted into a Lincompex demodulator 40 which expands the received signal according to the received control tone in the manner disclosed in the Leveque '499 patent. At this point, the output from the Lincompex demodulator 40 may be inputted into a signal processing device (such as a speaker, etc.). The de-emphasis circuit 17 may also be placed after the Lincompex demodulator 40 to achieve the same results. The radio frequency circuit 11, limiter 13, discriminator 15, and de-emphasis circuit 17 constitute a standard frequency demodulating system 12. Again, the de-emphasis circuit may be arranged differently as discussed above.

Figure 6A:
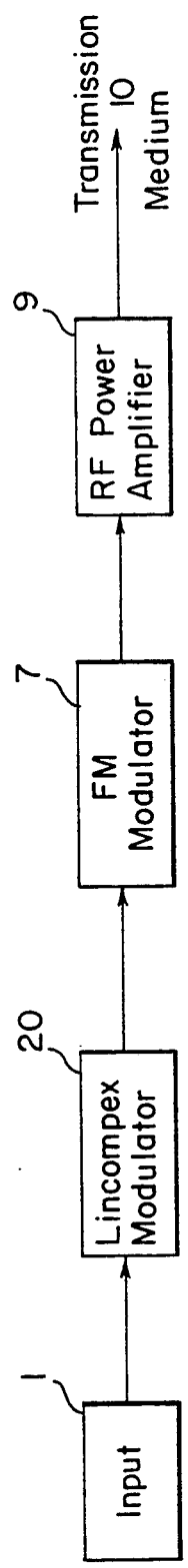
FIGS. 6(A) and 6(B) illustrate a FM Lincompex transmission system according to another preferred embodiment of the present invention.
Figure 6B:
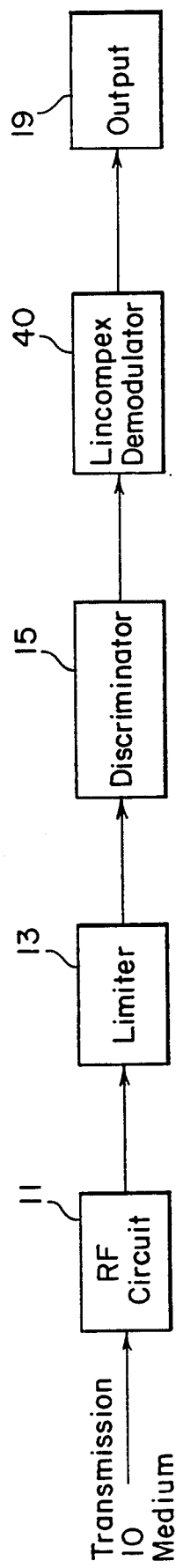

FIGS. 6(A) and 6(B) illustrate another preferred embodiment of the present invention. In this preferred embodiment of the present invention, frequency modulated complex waveforms are transmitted without utilizing the compressor 3 or the pre-emphasis circuit 5 in the transmitter as well as the de-emphasis circuit 17 in the receiver. More specifically, in this preferred embodiment of the present invention, the transmitter comprises a Lincompex modulator in combination with a simple frequency modulator, and the receiver comprises a simple frequency demodulator in combination with a Lincompex demodulator. Again, this preferred embodiment does not utilize the compressor circuit 3, pre-emphasis circuit 5, nor the de-emphasis circuit 17 of FIGS. 5(A) and 5(B). The remaining components of FIGS. 6(A) and 6(B) function substantially the same way as the components discussed above with respect to FIGS. 5(A) and 5(B).

Figure 1:
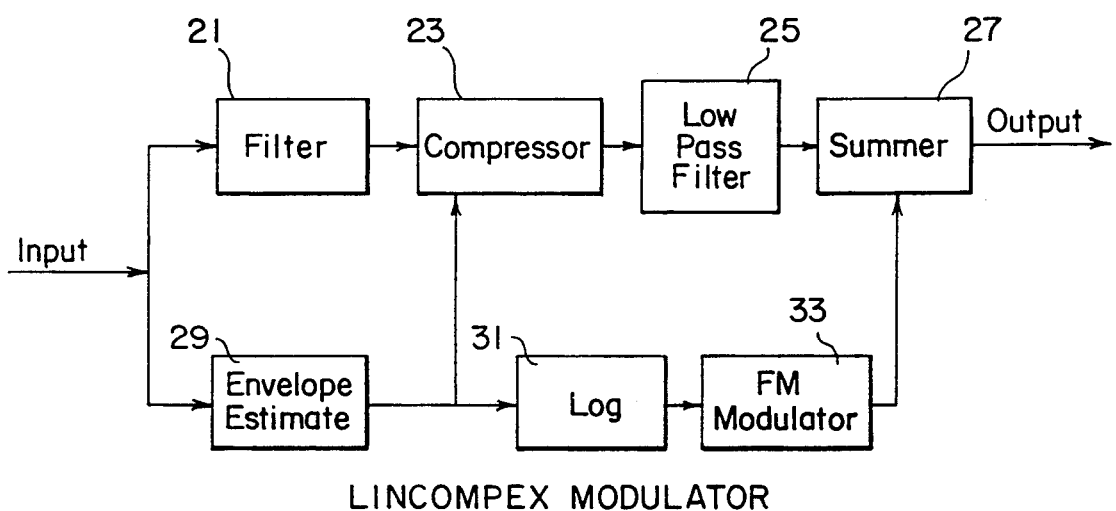
FIG. 1(A) illustrates a prior art Lincompex modulator.
FIG. 1(B) illustrates a Prior art Lincompex demodulator.
Figure 1:
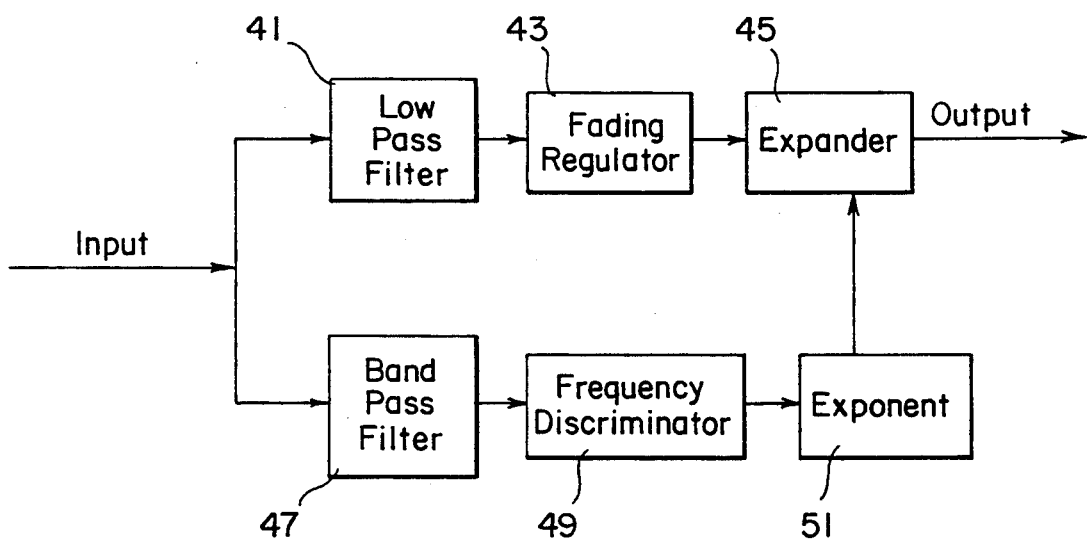
Figure 2A:
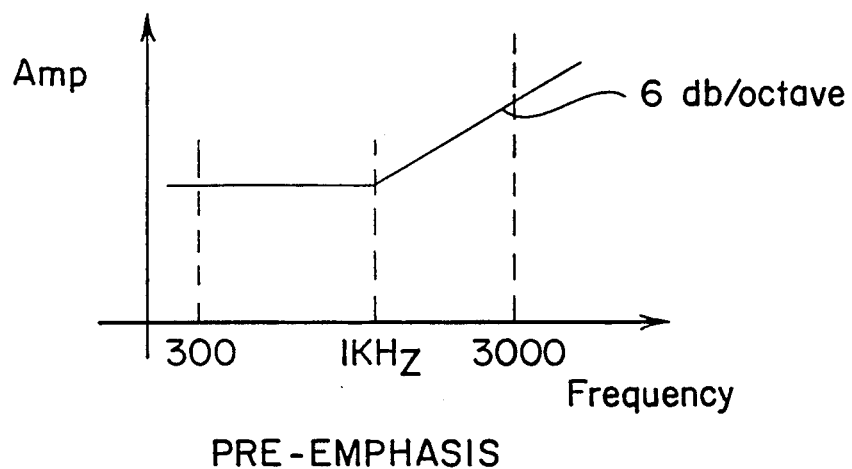
FIG. 2(A) illustrates the operations of a prior art pre-emphasis circuit.
Figure 2B:
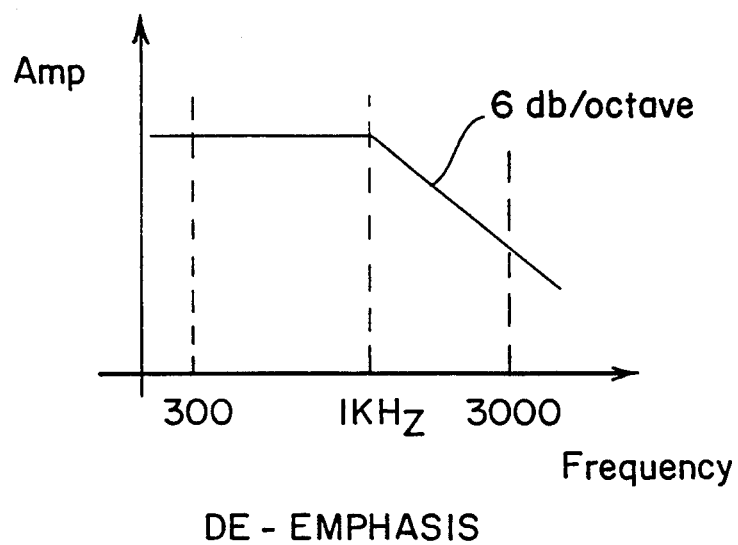
FIG. 2(B) illustrates the operations of a prior art de-emphasis circuit.
Figure 4A:
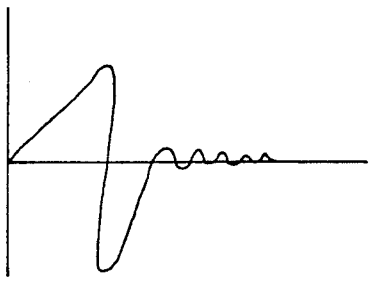
Figure 4C:
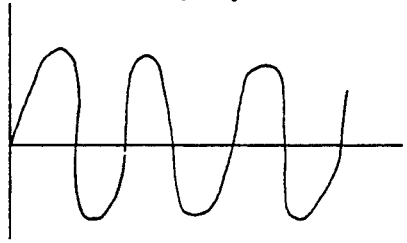

In these preferred embodiments of the present invention, the frequency modulation techniques may be used to enhance Lincompex communications. This is clearly shown with respect to FIG. 3(C). FIG. 3(C) demonstrates that the Lincompex modulator 20 has an infinite syllabic compression over an approximate 48 dB range. This infinite compression greatly improves the peak to average ratio of the modulated signal. As can be seen when comparing FIGS. 3(B) and 3(C), the peak to average ratio of the modulated signal when utilizing Lincompex signals (FIG. 3(C)) is greatly improved over the peak to average ratio of the modulated signal when utilizing a conventional compressor. Again, since the final system output of a frequency modulation system is from a discriminator in the receiver, which outputs a voltage signal representing the frequency swing of the frequency modulated signal, the average voltage output of the discriminator will reach its highest potential for an infinitely compressed signal. This is clearly demonstrated in FIG. 4(C). Since this infinitely compressed frequency modulated signal will produce a higher average voltage output from the discriminator, the outputted signal will appear larger for a given amount of added communication channel noise when contrasted with modulation systems not utilizing Lincompex techniques. This can be clearly seen by comparing FIGS. 4(A), 4(B) and 4(C). FIGS. 4(A), 4(B), and 4(C) represent the signal output from the discriminator for a given constant added noise existing on the communication channel in connection with the various transmission systems discussed in this application. As clearly demonstrated, the Lincompex signals being transmitted using frequency modulation techniques, demonstrated in FIGS. 4(C), realize a greater average voltage output from the discriminator than conventional FM transmissions illustrated in FIGS. 4(A) and 4(B). Also, using frequency modulation techniques to transmit a Lincompex complex waveform, the weak-signal "hiss" between syllables is eliminated. This is due to the quieting aspects of using the control tone produced by the Lincompex modulator.

In utilizing Lincompex techniques, a signal equivalent to a control tone signal must be established and combined with the compressed frequency modulated signal. As discussed in the '499 patent, the control tone utilized in the Lincompex techniques normally has a frequency of 2900 Hz. However, other frequency levels can be utilized as would be dictated by the requirements of the desired system which could be routinely determined by one of ordinary skill in the art. This control tone can be transmitted below the compressed frequency modulated signal bandpass, within the compressed frequency modulated signal by the use of notched filters, or transmitted via a different transmission medium as in a complex waveform situation, etc. Also, the characteristic type of waveform for the control tone signal may not necessarily be of the same type as the standard Lincompex signal. For example, the control tone signal in the preferred embodiments is an FM signal, but the control tone may be of any other type of modulation such as Amplitude Modulation.

With respect to FIG. 5(A), this preferred embodiment contemplates the combination of a Lincompex modulator with a conventional frequency modulator (FM) transmitter. In the conventional FM transmitter, compressors 3 are used to decrease the peak-to-average of the transmitted signal. The compressor in this conventional frequency modulated transmitter does not effect the performance of the Lincompex modulator with respect to the principles discussed above. However, as demonstrated in FIG. 6(A), by utilizing the Lincompex modulator 20, the conventional compressor 3 is not required in the FM transmitter.

Again, with respect to FIGS. 5(A) and 5(B), these preferred embodiments of the present invention contemplate the combination of Lincompex techniques with a conventional FM transmitter and receiver. In the conventional FM transmitter and receiver, a pre-emphasis circuit 5 and a de-emphasis circuit 17 are used to compensate for the minimal energy realized in the high frequencies, which is characteristic of a voice signal. More specifically, the pre-emphasis circuit 5 is a frequency response distortion which accentuates higher frequency energy more than lower frequency energy so as to make the higher frequency components produce more transmitter modulation. This greater transmitter modulation causes a higher high frequency energy output from the discriminator which in turn produces a higher signal to noise ratio in the output of the receiver.

In the receiver, the output of the discriminator 15 is inputted into the de-emphasis circuit 17 to restore the signal's higher frequencies to their proper level relative to the lower frequencies. Thus, the demodulated signal is restored to its original form.

As demonstrated in FIGS. 6(A) and 6(B), the pre-emphasis circuit 5 and the de-emphasis circuit 17 of the conventional frequency modulated transmitter and receiver are not necessarily required in the transmission of a FM signal when utilizing Lincompex techniques.

With respect to the noise reduction realized at the receiver end of the transmission system, the actual reduction in noise is realized due to the Lincompex techniques utilized. In other words, once the control tone is recovered, the original signal envelope is known. This means that the total receiver output, which is the compressed frequency modulated signal plus system noise, can be selectively amplified to recover the original envelope. By adapting the final output to the original signal envelope, the system noise in the final output can be substantially eliminated.

Figure 7:
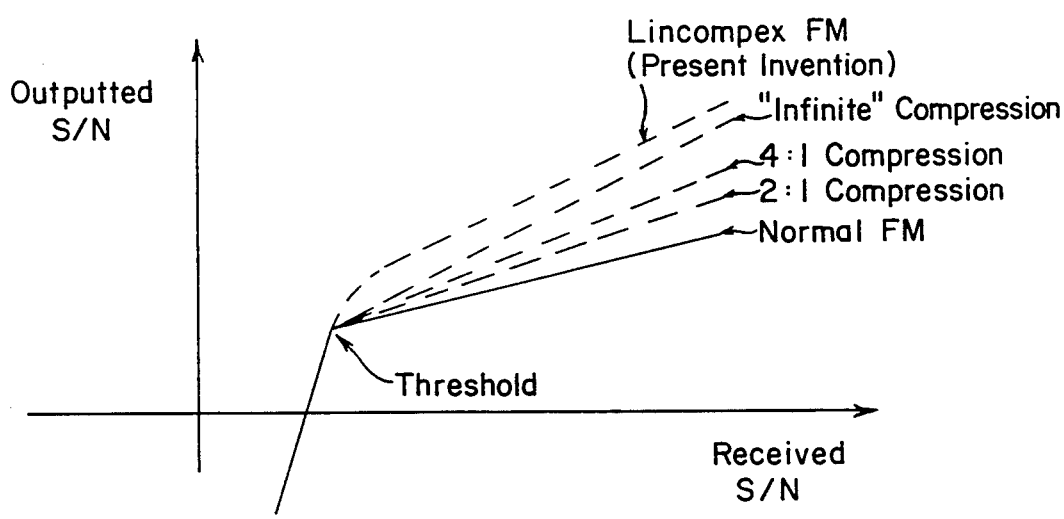
FIG. 7 illustrates the relationship between the outputted signal to noise ratio with respect to the received signal to noise ratio for the various FM transmission systems.

These improvements in the transmission of a frequency modulated signal are demonstrated in FIG. 7 FIG. 7 shows FM noise performance as a function of the signal to noise ratio. This graph illustrates the threshold of the FM signal, the "knee". When the system is operating at or very near the threshold, small variations of signal power cause significant changes in the output signal; i.e., one moment the signal is there, the next moment the signal has disappeared. This sudden loss of output is common around the threshold To avoid this problem (power mutilation), it is desirable to operate above the threshold. FIG. 7 demonstrates that the conventional FM systems required a high signal to noise ratio in the received signal to overcome the problems associated with the threshold. However, by utilizing the Lincompex techniques, FIG. 7 demonstrates that the FM Lincompex modulated system can avoid the S/N problems of the received signal that occurs at the threshold. This in turn allows the transmitter of the present invention to output a frequency modulated signal at a lower power level to realize the same receiver output levels realized in the conventional FM transmitting system wherein the conventional FM transmitting system would be transmitting at a much higher power level. Such improvements are realized by the preferred embodiments of the present invention.

From the above-described preferred embodiments, it is apparent that frequency modulation techniques may be utilized to transmit Lincompex complex waveforms which demonstrate a greater signal to noise ratio at the output of the receiver while substantially eliminating system noise. The Lincompex techniques of infinitely compressing the information signal prior to the frequency modulation process, according to the teachings of the present invention, substantially increase the average voltage of the output of the discriminator, thereby causing a perceived reception of greater transmitted power. Also, by producing in the transmitter a control tone representative of the compression process in the Lincompex modulator, the receiver of the present invention is able to adapt the received output signal to its original spoken envelope, thereby substantially eliminating system noise from the output of the receiver.

From the above-described embodiments of the present invention, it is apparent that the present invention may be modified as would occur to one of ordinary skill in the art without departing from the spirit or scope of the present invention which should be defined solely by the appended claims. Changes and modifications of the system contemplated by the present preferred embodiments will be apparent to one of ordinary skill in the art.

What is claimed is:

1. A transmitter for transmitting a frequency modulated signal over a communication channel, comprising:
    compressing means for compressing an input signal into a compressed signal;
    control tone generating means, operatively connected to said compressing means, for producing a control tone representing an envelope of said input signal;
    compression means, operatively connected to said compressing means and said control tone generating means, for providing further compression of said compressed signal and for compressing said control tone to produce a modified compressed signal and a modified control tone; and
    frequency modulating means, operatively connected to said compression means, for frequency modulating said modified compressed signal and said modified control tone and for transmitting the frequency modulated signal.

2. The transmitter as claimed in claim 1, further comprising:
    summing means, operatively connected between said compressing means, said control tone generating means, and said compression means, for combining said compressed signal and said control tone into a combined signal;
    said compression means providing further compression of said combined signal.

3. The transmitter as claimed in claim 1, wherein said frequency modulating means comprises:
    modulating means for frequency modulating said modified compressed signal and said modified control tone; and
    a radio frequency power amplifier, operatively connected to said modulating means, for amplifying the frequency modulated signals prior to transmission.

4. The transmitter as claimed in claim 1, wherein said frequency modulating means comprises:
    pre-emphasis means, operatively connected to said compression means, for emphasizing high frequency components of said modified compressed signal and said modified control tone; and
    modulating means, operatively connected to said pre-emphasis means, for frequency modulating the emphasized compressed signal and control tone.

5. The transmitter as claimed in claim 1, further comprising:
    combining means, operatively connected between said compressing means, said control tone generating means, and said compression means, for producing a Lincompex signal from said compressed signal and said control tone;
    said frequency modulating means frequency modulating and transmitting said Lincompex signal.

6. A system for transmitting and receiving a frequency modulated signal through a transmission medium, comprising:
    compressing means for compressing an input signal into a compressed signal and for producing a control tone representing an envelope of said input signal;
    compression means, operatively connected to said compressing means, for providing further compression of said compressed signal and for compressing said control tone to produce a modified compressed signal and a modified control tone;

frequency modulating means, operatively connected to said compression means, for frequency modulating said modified compressed signal and said modified control tone and for transmitting the frequency modulated signals over a communication channel;

frequency demodulating means for receiving and frequency demodulating the transmitted frequency modulated signals; and expanding means, operatively connected to said frequency demodulating means, for expanding the demodulated received signal according to the received control tone.

7. The transmitter as claimed in claim 6, further comprising:

summing means, operatively connected between said compressing means, said control tone generating means, and said compression means, for combining said compressed signal and said control tone into a combined signal;

said compression means providing further compression of said combined signal.

8. The system as claimed in claim 6, wherein said frequency modulating means comprises:

modulating means for frequency modulating said modified compressed signal and said modified control tone; and a radio frequency power amplifier, operatively connected to said modulating means, for amplifying the frequency modulated signals prior to transmission.

9. The system as claimed in claim 6, wherein said frequency modulating means comprises:

pre-emphasis means, operatively connected to said compression means, for emphasizing high frequency components of said modified compressed signal and said modified control tone; and modulating means, operatively connected to said pre-emphasis means, for frequency modulating the emphasized compressed signal and control tone.

10. The system as claimed in claim 6, wherein said frequency demodulating means comprises:

limiter means for removing spurious amplitude variations in the received frequency modulated signal; and discriminator means, operatively connected to said limiter means, for converting frequency components of the received frequency modulated signal into a voltage signal.

11. The system as claimed in claim 10, wherein said frequency demodulating means further comprises:

de-emphasis means, operatively connected to said discriminator means, for de-emphasizing high frequency components of said voltage signal.

12. The system as claimed in claim 6, further comprising:

combining means, operatively connected between said compressing means, said control tone generating means, and said compression means, for producing a Lincompex signal from said compressed signal and said control tone;

said frequency modulating means frequency modulating and transmitting said Lincompex signal.

13. A method for transmitting a frequency modulated signal through a transmission medium, comprising the steps of:

(a) compressing an input signal to produce a compressed signal;

(b) producing a control tone representing an envelope of the input signal;

(c) further compressing the compressed signal and compressing the control tone to produce a modified compressed signal and a modified control tone;

(d) frequency modulating the modified compressed signal and the modified control tone of said step (c); and (e) transmitting the frequency modulated signals of said step (d) through a medium.

14. The method as claimed in claim 13, further comprising the step of:

(f) combining the compressed signal and the control tone to form a combined signal;

said step (c) compressing the combined signal to produce a modified combined signal including said modified compressed signal and said modified control tone.

15. The method as claimed in claim 13, further comprising the step of:

(f) emphasizing high frequency components of the modified compressed signal and the modified control tone of said step (c) prior to executing said step (d).

16. The method as claimed in claim 13, further comprising the step of:

(f) producing a Lincompex signal from the compressed signal an the control tone;

said step (c) compressing the Lincompex signal to produce a modified Lincompex signal including said modified compressed signal and said modified control tone.

17. A method for transmitting and receiving a frequency modulated signal through a medium, comprising the steps of:

(a) compressing an input signal to produce a compressed signal;

(b) producing a control tone representing an envelope of the input signal;

(c) further compressing the compressed signal and compressing the control tone to produce a modified compressed signal and a modified control tone;

(d) frequency modulating the modified compressed signal and the modified control tone of said step (c);

(e) transmitting the frequency modulated signals of said step (d) through a medium;

(f) receiving the frequency modulated signals from the transmission medium;

(g) frequency demodulating the signals received in said step (f); and (h) expanding the demodulated signal of said step (g) according to the received control tone.

18. The method as claimed in claim 17, further comprising the step of:

(i) combining the compressed signal and the control tone to form a combined signal;

said step (c) compressing the combined signal to produce a modified combined signal including said modified compressed signal and said modified control tone.

19. The method as claimed in claim 17, further comprising the step of:

(i) emphasizing high frequency components of the modified compressed signal and the modified control tone of said step (c) prior to executing said step (d).

20. The method as claimed in claim 17, further comprising the step of:

(i) removing spurious amplitude variations in the received frequency modulated signal and control tone prior to executing said step (g).

21. The method as claimed in claim 17, further comprising the step of:

(i) de-emphasizing high frequency components of the frequency demodulated signal of said step (g) prior to executing said step (h).

22. The method as claimed in claim 17, further comprising the step of:

(i) producing a Lincompex signal from the compressed signal and the control tone;

said step (c) compressing the Lincompex signal to produce a modified Lincompex signal including said modified compressed signal and said modified control tone.

* * * * *